United States Patent [19]
Chiarabini et al.

[11] Patent Number: 5,963,216
[45] Date of Patent: *Oct. 5, 1999

[54] PROVIDING PRINT PREVIEW OF A PRINT JOB USING PRINTING CALLS FROM A PRINT DRIVER

[75] Inventors: Luca Chiarabini; Xavier Fernandez-Diaz Mascort; Rodolfo Jodra Barron; Xavier Rigau Rigau, all of Sant Cugat de Vallès, Spain

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/641,146

[22] Filed: Apr. 25, 1996

[51] Int. Cl.⁶ ........................................... G06T 3/00
[52] U.S. Cl. ............................. 345/439; 395/109
[58] Field of Search ..................... 345/433, 439, 345/326, 339–342, 348–354; 395/109, 111, 112, 113–117

[56] References Cited

U.S. PATENT DOCUMENTS 5,260,805  11/1993  Barrett ................................. 358/449
5,675,717  10/1997  Yamamoto ............................ 395/109

FOREIGN PATENT DOCUMENTS

2 280 528   2/1995  United Kingdom .
WO 89/06396  7/1989  WIPO .

Primary Examiner—Almis R. Jankus

[57] ABSTRACT

A print preview of a print job is performed. An operating system forwards to a printer driver, printing calls for the print job. The printer driver translates the printing calls to display calls for the print job. The printer driver forwards the display calls through the operating system to a display driver. The display driver displays a representation of the print job on a display.

27 Claims, 12 Drawing Sheets

PROVIDING PRINT PREVIEW OF A PRINT JOB USING PRINTING CALLS FROM A PRINT DRIVER

BACKGROUND

The present invention concerns printing and display of drawings within a computing system and pertains particularly to the preview of drawings before printing.

While of general use in the printing and display field, the present invention is especially useful to the field of computer driven printers particularly designed for producing engineering or other large drawings on paper, vellum, film or other print media which is drawn through the mechanism from a roll or from a manual or automatic sheet feed media path. Typically, the media may have a width from 8½ inches to as much as 3 or 4 feet or more.

With reference to a rectangular coordinate system, the paper or other print media is drawn through the printer in the X direction and a thermal inkjet printer carriage is mounted for movement transversely of the paper in what shall be referred to as the Y direction. A sheet of paper or other print media is either manually fed or paper is drawn from a supply roll thereof around a platen roller which may or may not be power driven. When the printer apparatus employs a thermal inkjet printing head or heads, precise control of the spacing between the print heads and the surface of the print media on which printing is to take place is essential otherwise acceptable print resolution is lost.

Inkjet printers, such as those sold by Hewlett Packard Company, offer substantial improvements in speed over the conventional X-Y plotter. Inkjet printers typically include a pen having an array of nozzles. The pens are mounted on a carriage which is moved across the page in successive swaths. Each inkjet pen has heater circuits which, when activated, cause ink to be ejected from associated nozzles. As the pen is positioned over a given location, a jet of ink is ejected from the nozzle to provide a pixel of ink at a desired location. The mosaic of pixels thus created provides a desired composite image.

Using printers for large print media introduces special problems in printer software. For example, many operating systems, such as the Microsoft Windows operating system, available from Microsoft Corporation having a business address of One Microsoft Way, Redmond, Wash. 98052, are currently limited as to the size of papers supported. This limitation has been inherited by applications as either a limited paper size support or as system crashes with big paper sizes.

One of the most used approaches to overcome size limitations of paper sizes is to scale a drawing. The scaling is done by the printer driver internally or in conjunction with a graphic-device interface (GDI) within the Windows operating system. Scaling is often presented as one scale factor or a source and destination paper size.

Traditional implementations of scaling in applications and drivers achieve their results by multiplying or dividing the received coordinates by a scale factor. Some scaling procedures accept only integer scale factors to avoid rounding problems.

Another way to overcome the size limitations of paper sizes is to report a bigger resolution than the device resolution. In that way the application and the GDI are forced to generate more pixels. However, big scale factors resulting in higher resolutions increase the likelihood that an application will cause the operating system to crash. In addition, there is limit to the amount of pixels which can be handled by the GDI.

Another problem which arises when using printers for large-sized print media, and sometimes even arises when using printers for normal-sized print media, is the lack of an adequate print preview. A print preview feature is particularly important for large-sized media printers because the cost of print media and ink can be significant, and reprinting can be costly both in the cost of print media and ink as well as in time spent printing.

Some applications, allow a print preview. However, very often the application print preview feature shows only a very inadequate preview of the drawing to be printed. For example, the application print preview may only show a representation of physical paper and an area within the physical paper on which the printing will take place. Alternatively, the application print preview may show a correct representation of the physical paper without showing if the drawing is going to be clipped because it will be outside of the plotting area.

BRIEF SUMMARY OF THE INVENTION

In accordance with the preferred embodiment of the present invention, a preview of a print job is performed. An operating system forwards printing calls for a print job. The printer driver translates the printing calls to display calls for the print job, and forwards them, through the operating system, to a display driver which displays a representation of the print job on a display, such as a monitor or screen. The preferred embodiment of the present invention allows any software application that runs under the operating system to preview any print job prior to actually printing it. The preferred embodiment of the present also provides a print preview to all those applications that do not have print preview as well as provides a higher accurate print preview for those applications which have a print preview built in.

In the preferred embodiment, the preview generated by the printer driver is a simplified representation of the print job. For example, in generating the simplified representation, the printer driver ignores any color, pattern fill, pen width and styled pen for the print job. Also, when generating the simplified representation, the printer driver paints just the outline of polygons and rectangles. The printer driver paints bitmaps and text as solid black rectangles which outline them. Additionally, when generating the simplified representation, the printer driver paints polylines as lines, and the printer driver paints only first and last pixels of every segment in scan lines.

In the preferred embodiment, in response to a user making a selection by clicking on a "skip preview" button on a print progress window, the print job is printed on a printer without any further print preview or other user interaction. Also, after displaying a page of the print job on the display, the printer driver waits a predetermined amount of time for user input, before printing the page of the print job. When the predetermined amount of time expires before user input is received, the printer driver prints the page of the print job. The print job may be canceled at any time by a user clicking on a cancel button on a print progress window.

In the preferred embodiment, in order to print the print job on a printer, the operating system re-sends the print calls to the printer driver. In the preferred embodiment, the print calls are sent kept in a Windows meta-file by the operating system.

The present invention provides an efficient way to provide a print preview by a printer driver.

DETAILED DESCRIPTION OF THE PREFERRED EMBODIMENT

Figure 1:
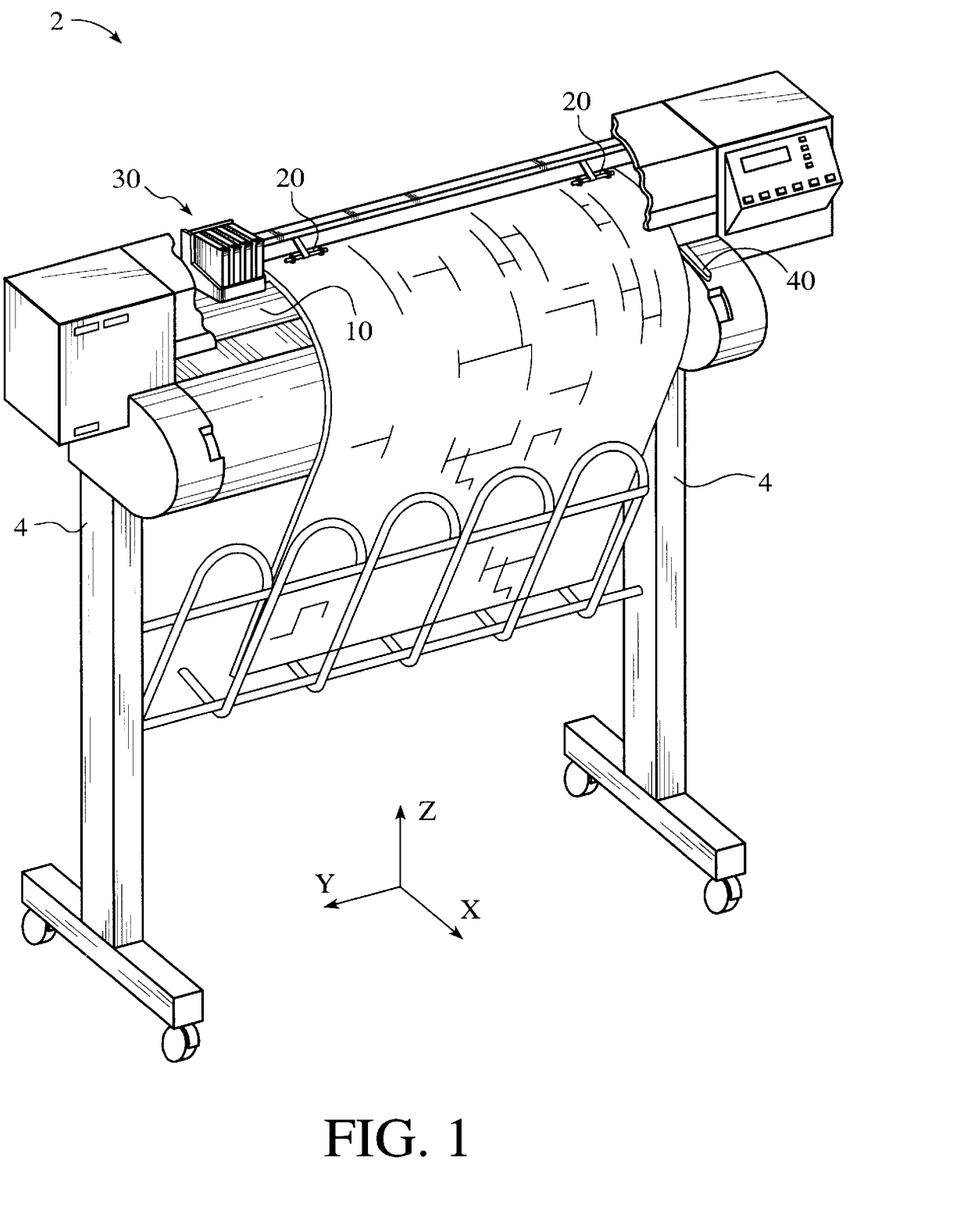
FIG. 1 is a perspective view of a printer/plotter mechanism showing the cover partly broken away to reveal a platen roller, pinch rollers and a print head carriage mounted on slider rods which extend parallel to the axis of the platen roller.

FIG. 1 is a perspective view of a printer/plotter mechanism having a chassis 2 supported by a pair of spaced legs 4 and a housing which includes a generally arcuate cover 6 for containing a roll 7 of print medium such as paper, vellum or film. As seen in the broken away section at the top of FIG. 1, a platen roller 10 extends transversely of the apparatus in the Y direction to provide a support and printing path at its upper surface for the medium upon which printing is to take place. A pair of slider rods support a transversely movable print head carriage 30 having a thermal inkjet print head or a plurality of thermal inkjet print heals mounted thereon which are positioned a precise distance above the platen roller 10. The top portions of four pinch rollers 20, two each being mounted on the tops of two different printer roller support members as is an actuating lever 40 for moving the print roller support members into and out of their operative position.

Figure 2:
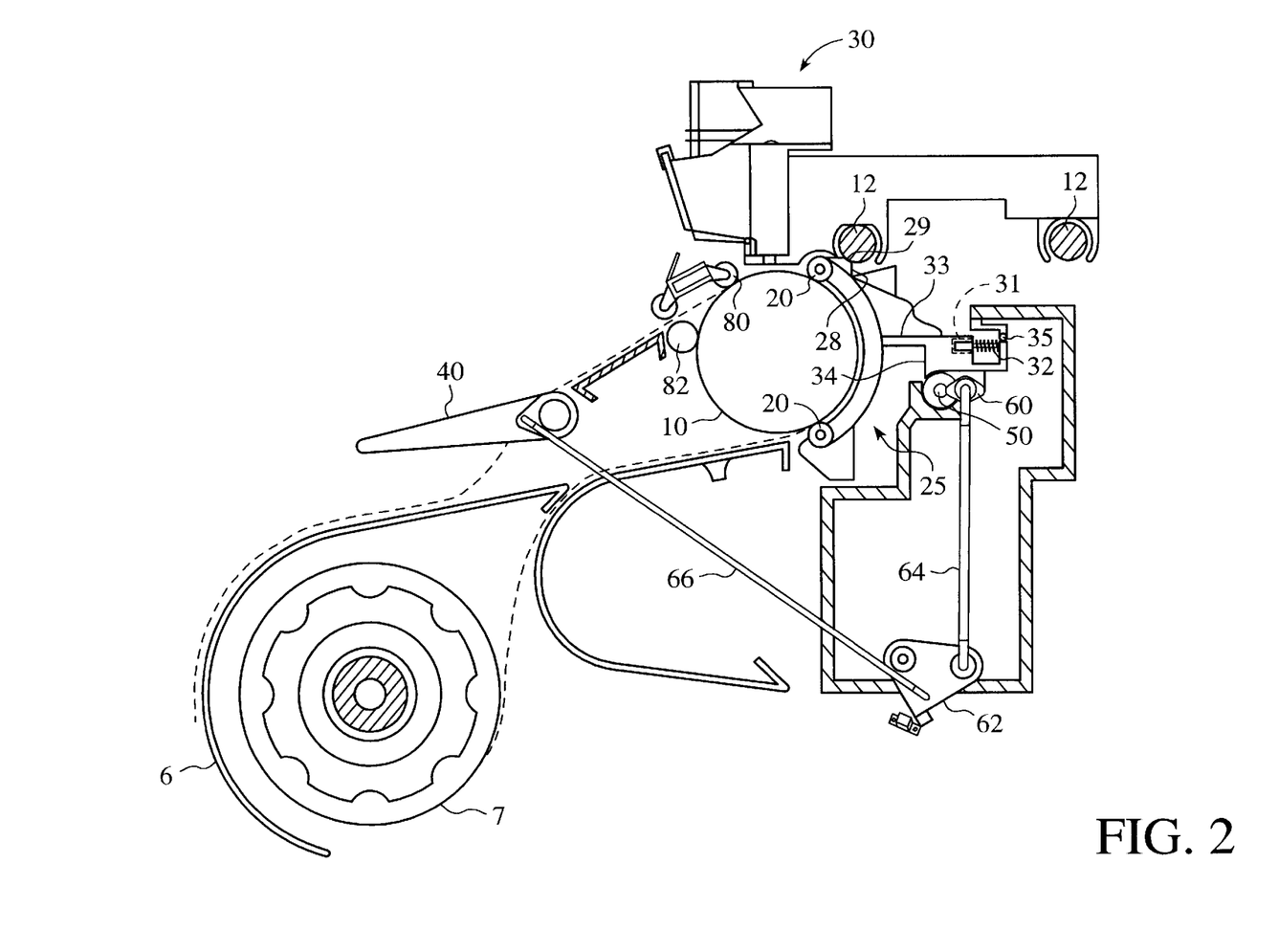
FIG. 2 is right hand cross sectional elevation showing the ends of the platen roller, pinch rollers and mechanism for moving the pinch roller support member into and out of an operative position for the printer/plotter shown in FIG. 1.

In FIG. 2, the paper or other print media path is shown by the dashed line. Also the pinch roller support member 25 has at least one rearwardly extending upper stabilizer shoulder 28 having an arcuate surface 29 thereon which limits upward motion of the pinch roller support member 25 when it is retracted away from the platen roller 10 by abutment of the surface 29 with one of two printer carriage slider rods 12 mounted on the chassis of the printer/plotter. A generally cylindrical support bearing is provided at the rearward end of the support arm 27 and is seen to have a bore 31 in the end thereof which receives one end of a compression spring 32.

A support bearing 35 is mounted on the printer/plotter chassis and has a circular/cylindrical interior surface which receives and supports the support arm 27. The inside diameter of the surface of bearing 35 is made slightly larger than the outside diameter of the bearing surface on the support arm 27 to permit vertical movement of the arm 27 in the bearing 35 within a selected angular tolerance. The distance from the captured end 28 of the support arm 27 to the centerline of the platen roller 10 is preferably about twice the distance from the centerline of the pinch rollers to the center of curvature of the arcuate media guide surface 21 which also generally coincides with the centerline of the platen roller 10. The compression spring 32 thus biases the pinch roller support member 25 and pinch rollers 20 toward the platen roller during printing. Thus, if the captured end 28 of the support arm is vertically displaceable in the bearing 35 within the selected angular tolerance, the pinchroller position will shift angularly around the platen roller 10 only about one half the selected angular bearing tolerance because the assembly is constrained to rotate about the center of the platen roller 10.

When it is desired to load a sheet of printing medium into the printer/plotter or printing medium either manually or from the roll 7 thereof, the paper is fed until movement of the lead end thereof is terminated by abutment in the nap between the lower pinch rollers 20 and the platen roller 10. The platen roller is then rotated in a counterclockwise direction to draw the paper between the platen roller 10 and the arcuate guide surface of the roller support member 25 and subsequently past the upper pinch rollers 20. Paper can be removed when desired by retracting the pinch roller support member 25 and pinch rollers 20 away from the platen roller 10. For this purpose, the support and actuation arm 27 has a substantially vertically extending shoulder 33 thereon which may be engaged by a retainer arm 34 which is fixedly attached to a transversely extending shaft 50 mounted in the printer/plotter chassis. Rotation of the shaft 50 to retract the pinch roller support member 25 to its open non-pinching position is accomplished by affixation of a bellcrank 60 to the shaft 50 so that the shaft may be rotated by movement of the bellcrank 60 which is in turn attached to a second bellcrank 62 by a connecting rod 64. The second bellcrank 62 is connected to the pinch arm release handle 40 by another connecting rod 66, the bellcranks and pinch arm release levers being pivotally affixed to the printer/plotter chassis or rotatable rod 50 in a manner which will be apparent to persons skilled in the art. It will be appreciated that a number of separate pinch roller support members 25 may be mounted along the length of the platen roller 10 and that all may be commonly moved to their operative position or retracted therefrom by providing a number of retainer arms 34 on the rotatable shaft 50 which is turned when desired by the pinch arm release lever linkage.

Figure 3:
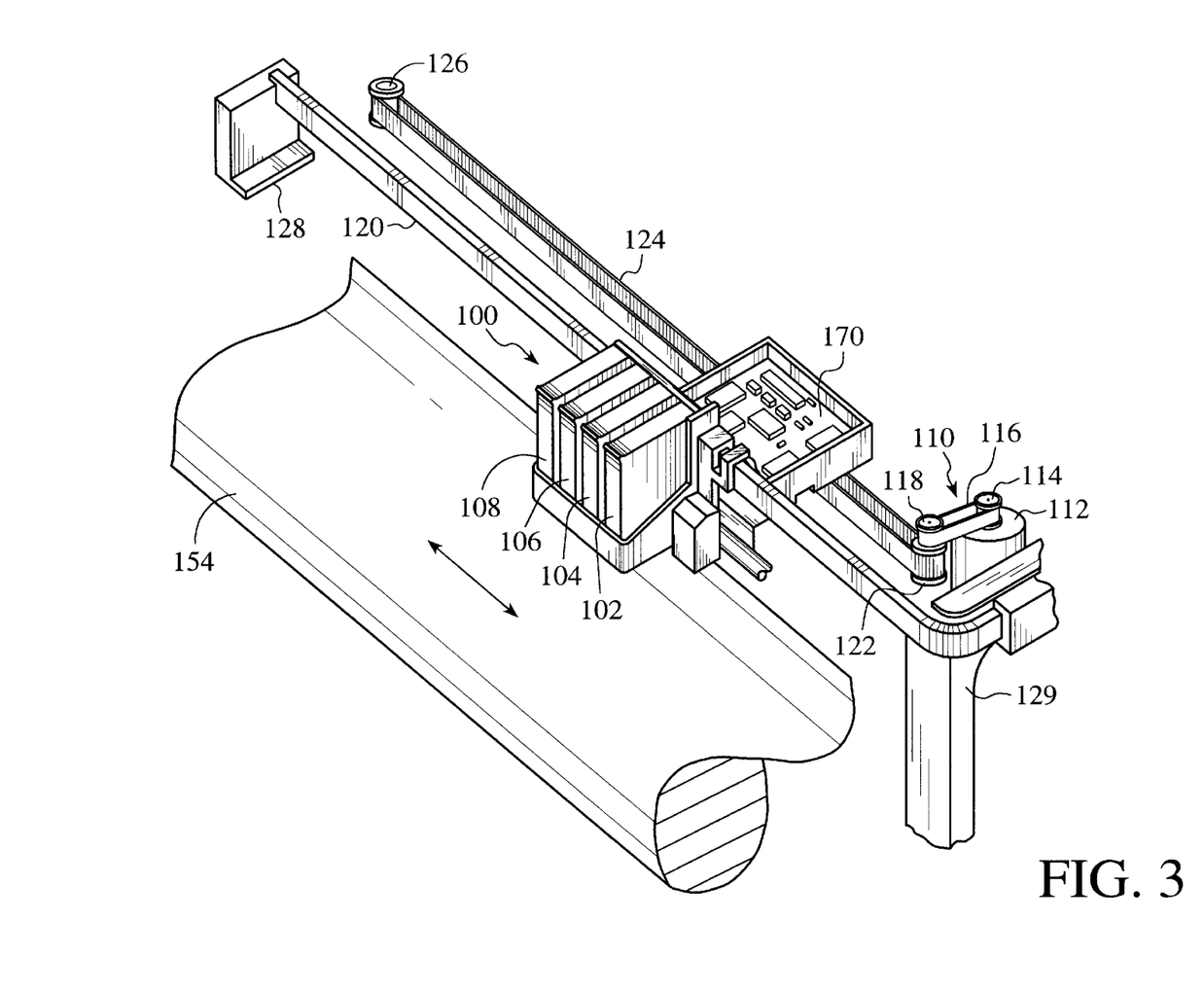
FIG. 3 is a perspective view of the carriage assembly, the carriage positioning mechanism, and the paper positioning mechanism of a printer/plotter similar to the one shown in FIG. 1.

FIG. 3 is a perspective view of a carriage assembly 100, a carriage positioning mechanism 110 and an encoder strip 120 for a printer similar to that shown in FIG. 1. The carriage positioning mechanism 110 includes a carriage position motor 112 which has a shaft 114 extending therefrom through which the motor drives a small belt 116. Through the small belt 116, the carriage position motor 112 drives an idler 122 via the shaft 118 thereof. In turn, the idler 122 drives a belt 124 which is secured by a second idler 126. The belt 124 is attached to the carriage 100 and adapted to slide therethrough.

The position of the carriage assembly in the scan axis is determined precisely by the use of the code strip 120. The code strip 120 is secured by a first stanchion 128 on one end and a second stanchion 129 on the other end. An optical reader (not shown) is disposed on the carriage assembly and provides carriage position signals which are utilized by the invention to achieve optimal image registration.

The media and carriage position information is provided to a processor on a circuit board 170 disposed on the carriage assembly 100 for use in connection with pen alignment techniques of the present invention. (The terms pen and cartridge are used interchangeably herein as is common in the art.) The printer has four inkjet pens, 102, 104, 106, and 108 that store ink of different colors, e.g., black, yellow, magenta and cyan ink, respectively. As the carriage assembly 100 translates relative to the medium along the x and y axes, selected nozzles in the thermal inkjet cartridge pens are activated and ink is applied to the medium. The colors from the three color inkjet pens are mixed to obtain any other particular color.

Figure 4:
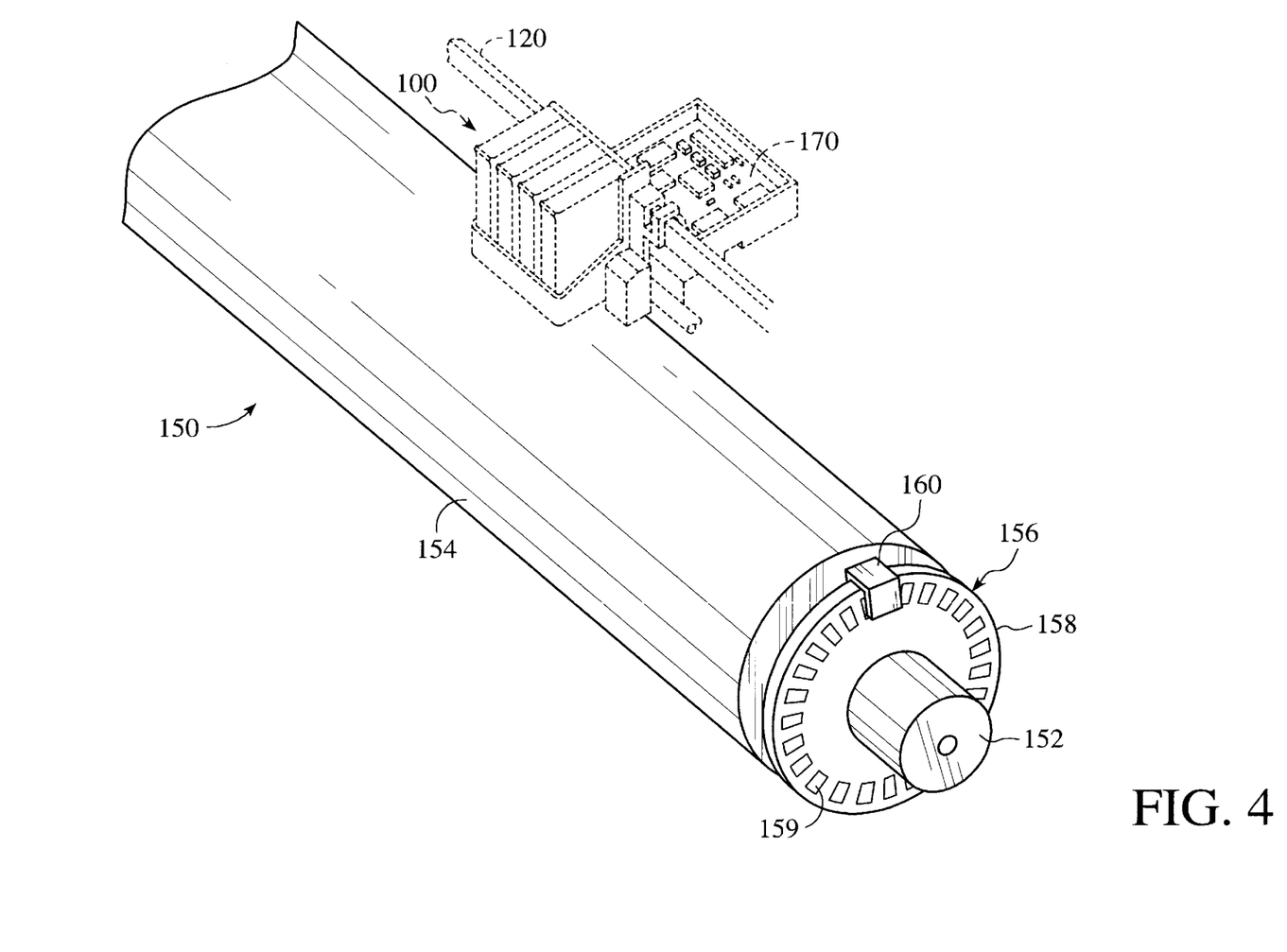
FIG. 4 is perspective view of a simplified representation of a media positioning system utilized in a printer/plotter similar to the one shown in FIG. 1.

FIG. 4 is perspective view of a simplified representation of a media positioning system 150 utilized in the inventive printer. The media positioning system 150 includes a motor 152 which is coaxial with a media roller 154. The position of the media roller 154 is determined by a media position encoder 156. The media position encoder includes a disc 158 having a plurality of apertures 159 therein. An optical reader 160 provides a plurality of output pulses which facilitate the determination of the roller 154 and, therefore, the position of the media 30 as well.

Figure 5:
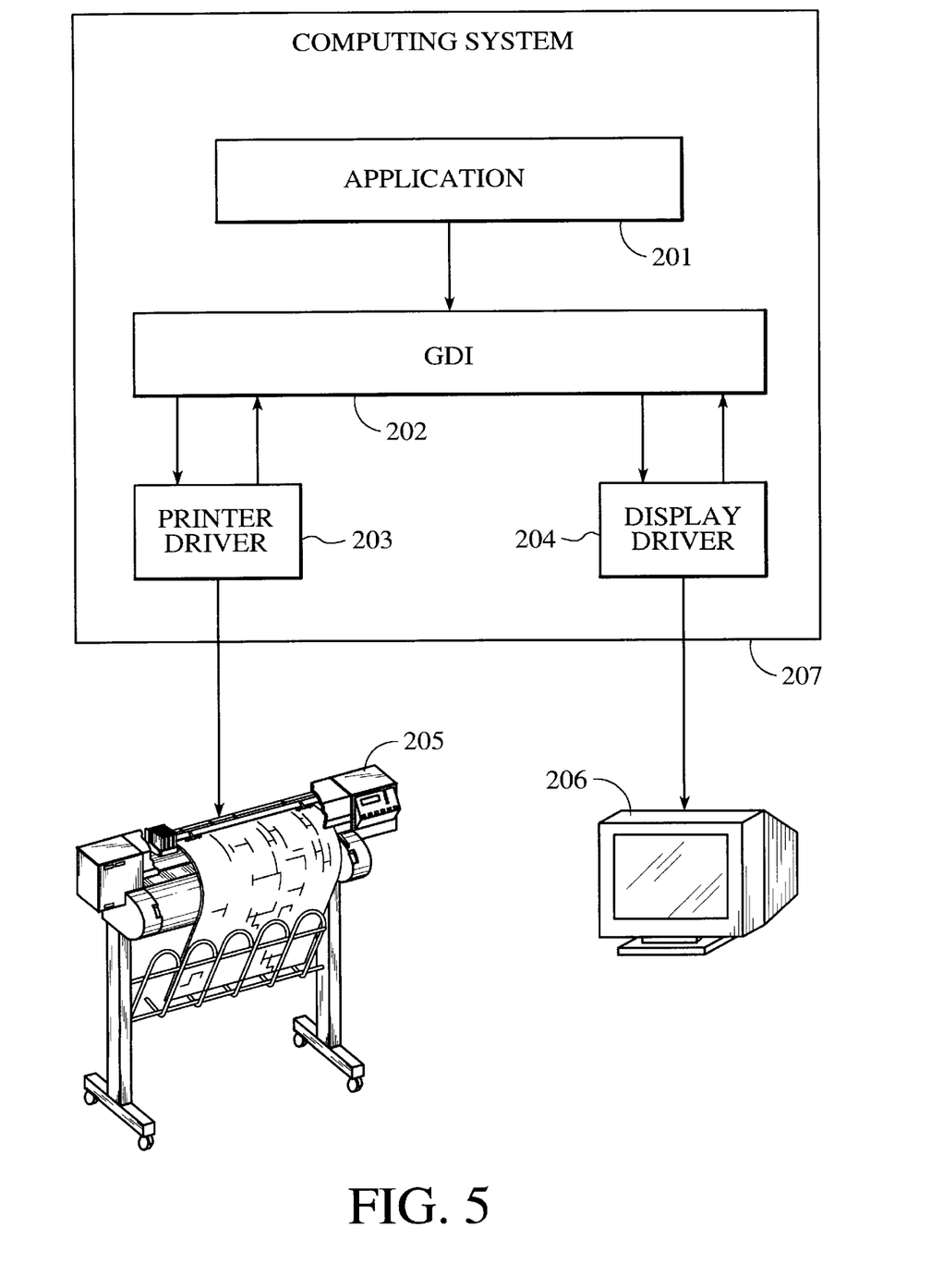
FIG. 5 shows a simplified block diagram of the organization of a computing system which includes drivers for a printer and a display in accordance with a preferred embodiment of the present invention.

FIG. 5 shows a simplified block diagram of the organization of a computing system 207. Computing system 207 runs various application processes, as illustrated in FIG. 5 by an application process 201. When application 201 desires to print information on a printer 205, or display information on a monitor 206, application process makes calls to graphic-device interface (GDI) 202. As described in the illustrated embodiment herein, GDI 202 is a part of a Microsoft Windows operating system. See for example, Device Driver Adaptation Guide for the Microsoft Windows Operating System, Version 3.1, available from Microsoft Corporation.

For information to be displayed on monitor 206, GDI 202 sends device-independent graphics commands to a display driver 204. Display driver 204 translates the independent graphics commands from GDI 202 into commands which action display 206 can use to display the information. Driver 204 also can transfer to GDI 202 and onto application 201 information about color resolution, screen size and resolution, graphics capabilities and other advanced features that may be available on display 206.

For information to be printed on a printer 205, GDI 202 sends device-independent graphics commands to a printer driver 203. Printer driver 203 translates the independent graphics commands from GDI 202 into commands and action printer 205 can use to print the information. Printer driver 203 also can transfer to GDI 202 and onto application 201 information about color resolution, resolution, graphics capabilities and other advanced features that may be available on printer 205.

In the preferred embodiment, printer driver 203 allows for scaling to fit large-sized paper printed out by printer 205. The scaling uses an integer scale factor and a non-integer scale factor. The total scale factor results from a concatenation of the two scaling steps: an integer scaling step and a non-integer scaling step. This allows a very good fit of a print-out onto the selected paper size. The invention is suitable for use on any type of sheet or roll feed media including paper, coated paper, film, transparencies, etc.

Printer driver 203 has a front-end which scales all coordinates and dimensions, as further described below. This is used for the integer portion of the scaling. The non-integer portion of the scaling is done by printer driver 203 reporting a virtual (or "fake") resolution to GDI 202. The total scale factor (TSF) is therefore derived from the integer scale factor (ISF) and the non-integer scale factor (also called real scale factor (RSF)) using the formula set out in Table 1 below:

TABLE 1 total scale factor = integer scale factor * non-integer scaling
TSF = ISF * RSF

For example, when printer 205 has a real resolution of 300 dpi and the total scale factor is 254%, printer driver 203 will use 2 as the real scale factor and 1.27 as the non-integer scale factor. Thus printer driver 203 will report a resolution of 381 dpi (300 dpi*1.27) to GDI 202. This will result in a correct 254% scale factor for the printed output of printer 205.

In the preferred embodiment, the non-integer scale factor is typically in the range of 0.0 to 10.0 and the resolutions reported to GDI 202 by printer driver 203 will be in the range of 300 dots per inch (dpi) to 600 dpi, or in the range of 600 dpi to 1200 dpi, depending upon whether the actual resolution of printer 205 is 300 dpi or 600 dpi, respectively. For these resolutions, an maximum dimension (of 297 millimeters) seen by application 201 will have 14031 pixels when the actual resolution of printer 205 is 600 dpi or 7015 pixels when the actual resolution of printer 205 is 300 dpi. Since this number is significantly below the GDI limit of 32,768 pixels, there will be very few chances for the application 201 to overflow.

In order to avoid overflow problems with applications that support big paper sizes, printer driver 203 also allows using a non-integer factor between 0 and 1.0. This way application 201 will see a lower resolution and thus internal coordinates will be smaller. This approach provides a robust solution but results in a degradation of the quality of the output of printer 205. In the preferred embodiment, printer driver 203 chooses this option only when necessary.

Figure 6:
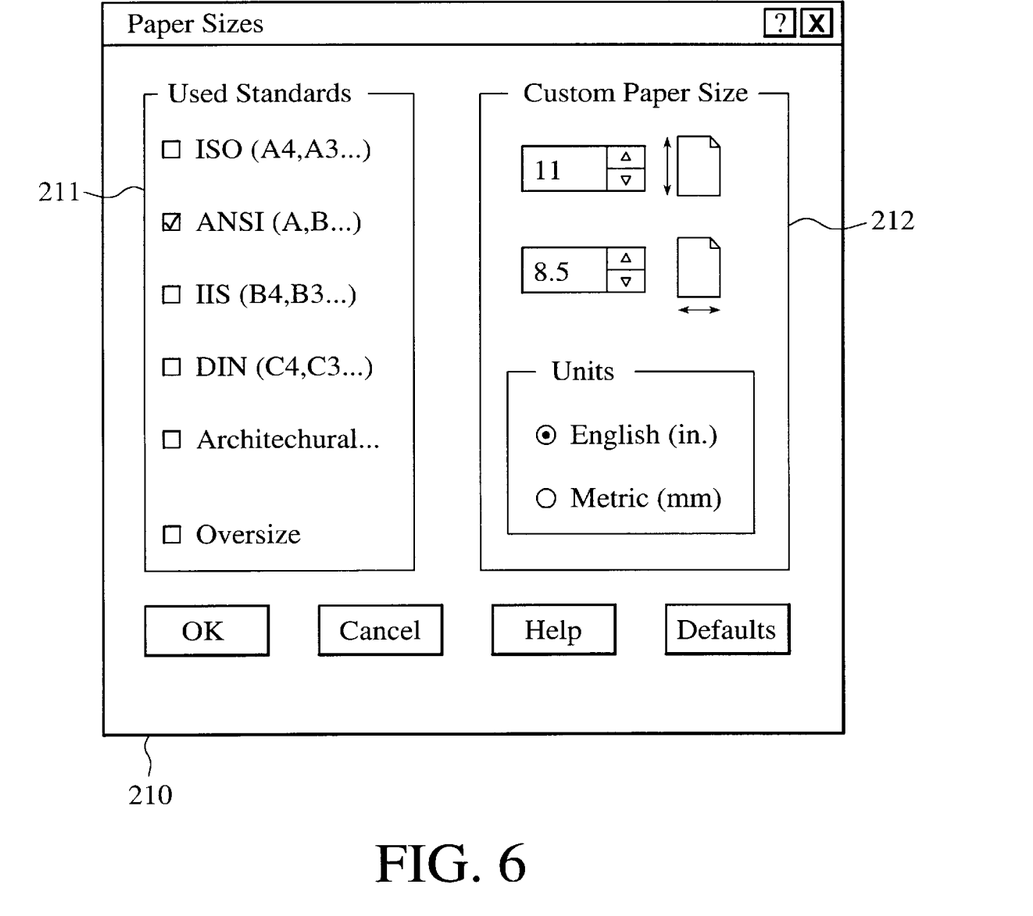
FIG. 6, FIG. 7 and FIG. 8 show window displays for the computing system shown in FIG. 5, the displays illustrate selection of paper sizes and scaling of output to be printed, in accordance with a preferred embodiment of the present invention.

FIG. 6 shows a paper sizes dialog box 210, originated by printer driver 203 and displayed on display 206, when called up by a user. Using paper sizes dialog box 210, a user can select a standard paper size from box 211 or use a box 212 to set out a custom paper size. When using box 212, the user can specify a length of the print media, a height of the print media and indicate which units (English or metric) are being used.

Figure 7:
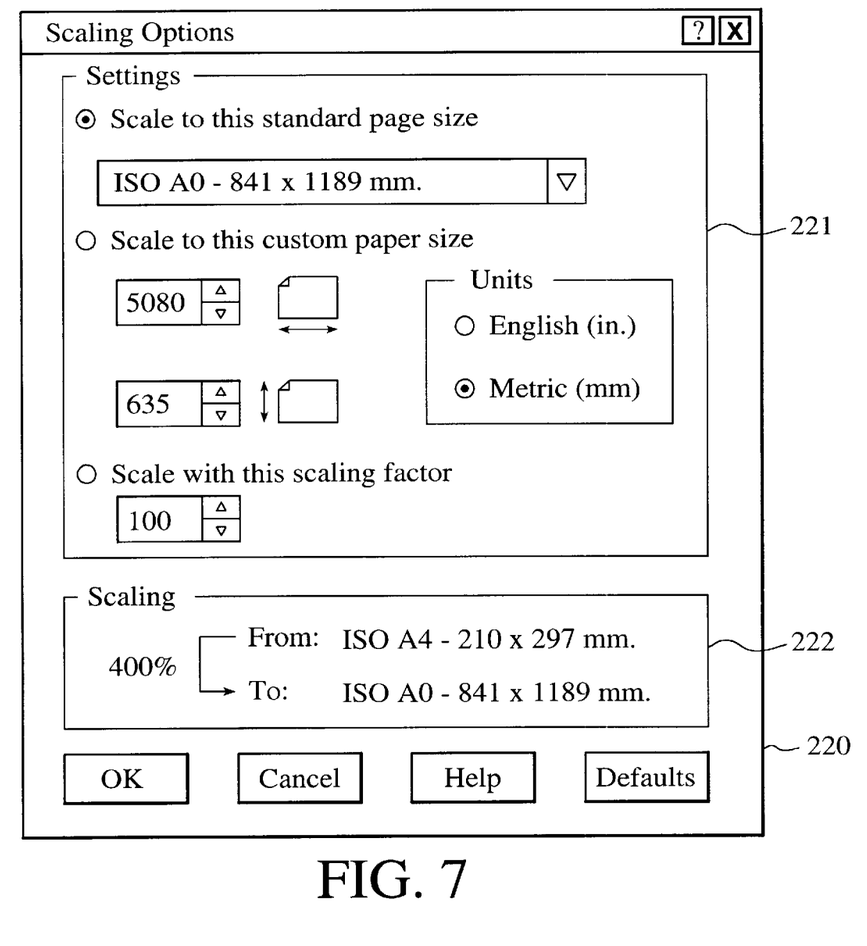

FIG. 7 shows a scaling options dialog box 220, originated by printer driver 203 and displayed on display 206, when called up by a user. Using scaling options dialog box 220, a user can select a scaling method from settings box 221. The user may scale to a standard page size, scale to a custom paper size or scale with a designating scaling factor. In the preferred embodiment, the standard page sizes are as shown in box 211. When electing to scale to a custom paper size, the user can specify a length of the print media, a height of the print media and indicate which units (English or metric)

are being used. Alternately, the user can chose a scale factor from 25% to 3600%.

Figure 9:
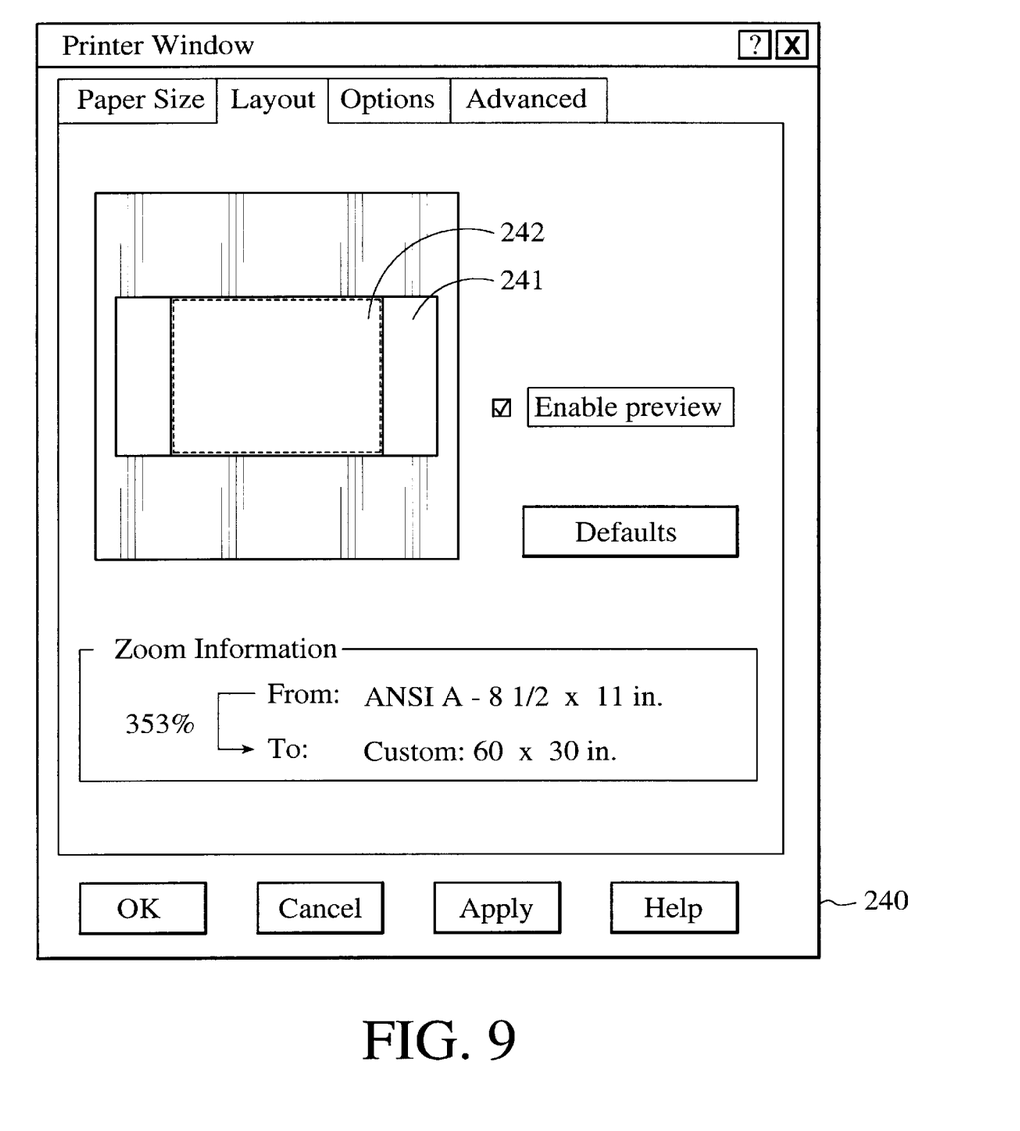
FIG. 9 shows a window display for the computing system shown in FIG. 5, the display illustrates scaling and the selection of print preview and layout options for output to be printed, in accordance with a preferred embodiment of the present invention.
Figure 10:
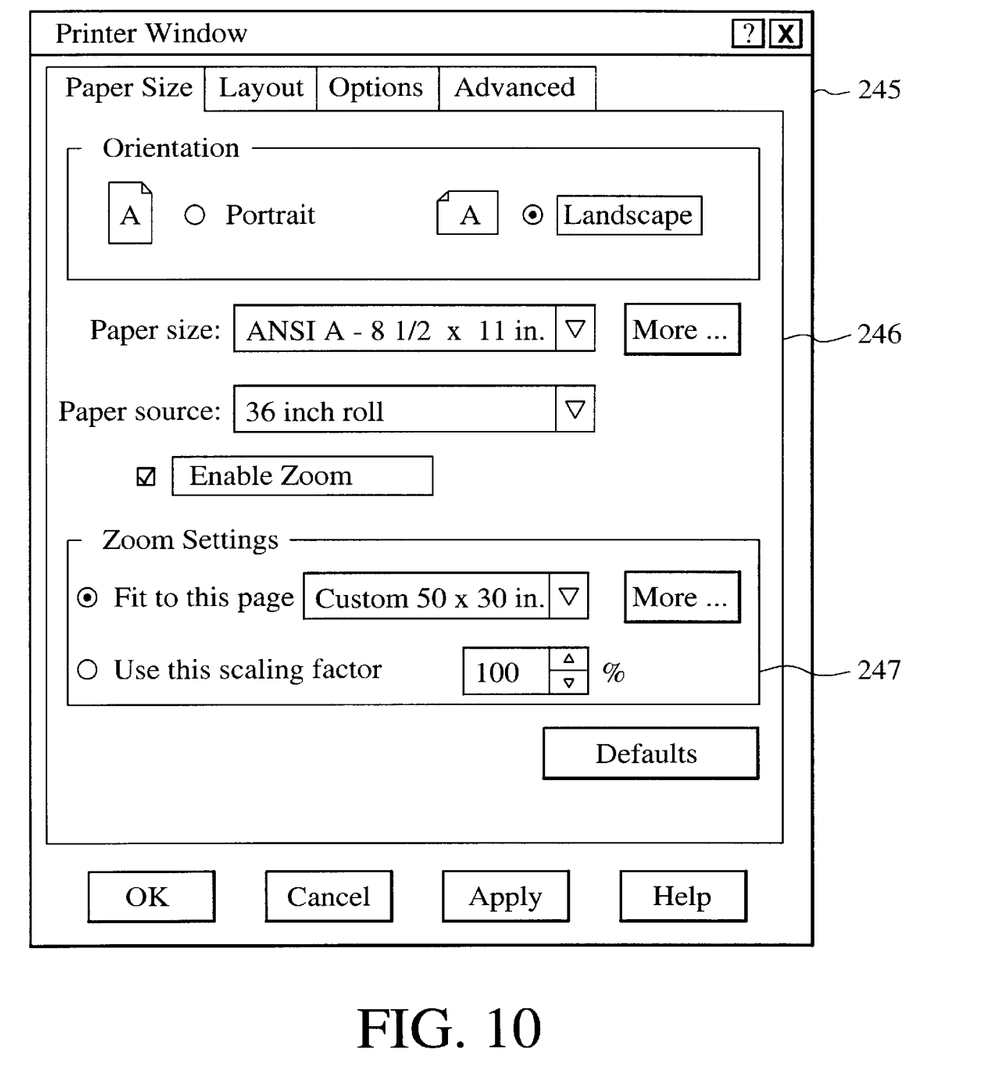
FIG. 10 shows a window display for the computing system shown in FIG. 5, the display illustrates scaling and the selection of print preview and layout options for output to be printed, in accordance with an alternative preferred embodiment of the present invention.

In one embodiment, the screen display of FIG. 7 is eliminated and its function is incorporated into the screen displays of FIG. 9 and FIG. 10.

Before accepting new scaling parameters, when the user has clicked on the "OK" button at the bottom of scaling options dialog box 220, and if the user has selected "Fit to custom size" in box 221, printer driver 203 will check the source paper size and the destination paper sizes. If the scaling factors in the two dimensions are different more than 10%, printer driver 203 will warn the user by displaying warning dialog box 230 shown in FIG. 8.

Figure 8:
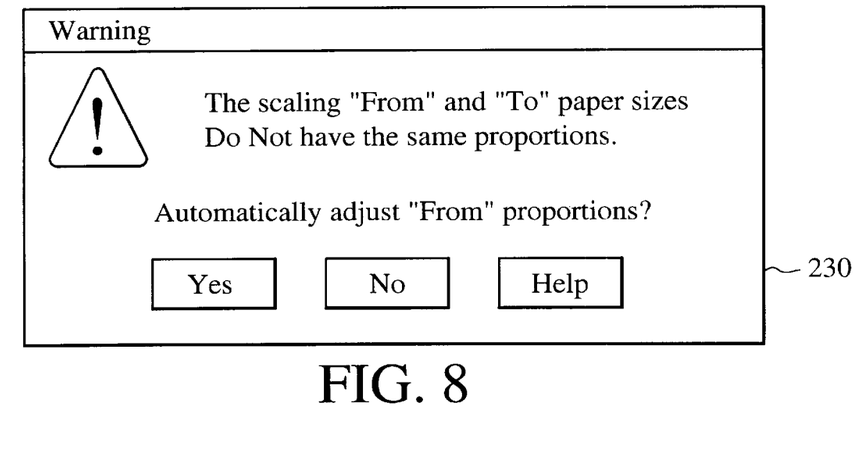

FIG. 8 shows warning dialog box 230 containing the following text: "The Scaling 'From' and 'To' paper sizes do not have the same proportions. Automatically adjust 'From' proportions?"

Printer driver 203 performs scaling using a series of equations. Definitions for the variables used in the equations are set out in Table 2 below:

TABLE 2

| Variable | Definition |
|---|---|
| X Scale Factor (XSF) | The ratio between the destination paper width and the source paper width. |
| Y Scale Factor (YSF) | The ratio between the destination paper height and the source paper height. |
| Scale Factor (SF) | Vector notation for (XSF,YSF) |
| Total Scale Factor (TSF) | The real number by which the drawing must be isotropically scaled. |
| Integer Scale Factor (ISF) | The integer that is less than the TSF. This is used to achieve the integer scaling. |
| Real Scale Factor (RSF) | The number by which ISF must be multiplied to get TSF. RSF is used to compute the fake resolution reported to GDI 202. |
| Physical paper size (PPS). | The dimensions of the paper utilized by printer 205. (mm) |
| Reported Physical paper size (PPS'). | The dimensions of the paper reported by printer driver 203 to GDI 202. (mm) |
| Imageable Area (IA). | The dimensions of the printing area for printer 205. (mm) |
| Reported Imageable Area (IA'). | The dimensions of the printing area reported by printer driver 203 to GDI 202. (mm) |
| Printing Offset (PO) | The margins, or offset, from the upper left corner of the PPS to the upper left corner of the IA for printer 205. (mm) |
| Reported Printing Offset (PO'). | The margins, or offset, from the upper left corner of the PPS to the upper left corner of the IA reported by printer driver 203 to GDI 202. (mm) |
| Resolution (RES) | Number of dots per inch for printer 205. (dpi) |
| Virtual resolution (RES') | Number of dots per inch reported by printer driver 203 to GDI 202. (dpi) |
| Coordinate (X,Y) | A point coordinate for use by printer 205. (mm) |
| Reported Coordinate (X,Y)' | A point coordinate for the RES' reported by printer driver 203 to GDI 202. (mm) |
| Received Co-ordinate (X,Y)" | A point coordinate as received by printer driver 203 from GDI 202. (mm) |
| Distance A(X,Y) | A distance in the (X,Y) direction for use by printer 205. (mm) |
| Reported distance A(X,Y)' | A distance in the (X,Y) direction for the RES' reported by printer driver 203 to GDI 202. (mm) |
| Received Distance A(X,Y)" | A distance in the (X,Y) direction as received by printer driver 203 from GDI 202. (mm) |

In order to perform appropriate scaling, printer driver 203 determines XSF and YSF from the user input to paper sizes dialog box 210 and scaling options dialog box 220. This is performed, for example, by dividing the width and the height of the paper size selected in paper sizes dialog box 220, respectively by the width and the height of the paper size selected in scaling options dialog box 210. Alternately, TSF may be directly set out by the user in scaling options dialog box 220.

Once printer driver 203 has determined XSF and YSF, printer driver 203 calculates TSF (if not directly set out by the user), ISF and RSF. This is done by the equations set out in Table 3 below:

TABLE 3

$$TSF = \min(XSF, YSF)$$
$$ISF = \text{floor (TSF) or ceiling (TSF)}$$
$$RSF = TSF/ISF$$

Generally floor (TSF) is used to calculate ISF. Ceiling (TSF) is used to calculate ISF generally only to avoid overflow problems with applications that support big paper sizes or to scale down. As will be understood from the above equations, the isotropic total scale factor (TSF) is chosen by taking the smallest scale factor (of XSF and YSF) in order to keep the scaled drawing inside the destination paper and thus avoid clipping objects.

Printer driver 203 uses TSF, ISF and RSF, and the values of PPS, IA, PO and RES for printer 205 to generate values for PPS', IA', PO' and RES' which are forwarded from printer driver 203 to GDI 202. The reported page size (PPS') is equal to the size of the source paper selected by the user in paper sizes dialog box 210. Printer driver 203 calculates IA', PO' and RES' using the equations set out in Table 4 below:

TABLE 4

$$SF = PPS/PPS'$$
$$IA' = IA/SF$$
$$PO' = PO/SF$$
$$RES' = RES * RSF$$

As will be understood from the above equations, the reported imageable area (IA') is the imageable area (IA) of the destination paper scaled down by the anisotropic scale factor (SF). When the IA' is scaled up in the equations below by TSF, which is isotropic, some spare area may be left in the destination paper. The reported printed offset (PO') is the printed offset (PO) of the destination paper scaled down by the anisotropic scale factor (SF). The virtual resolution (RES') is the resolution (RES) of printer 205 multiplied by the real scale factor (RSF) to make the application generate more dots and thus bigger objects.

When printing, printer driver 203 converts coordinates (X,Y)" and distances A(X,Y)" received from GDI 202 to coordinates (X,Y) and distances A(X,Y), respectively, for printer output of printer 205 using the equations set out in Table 5 below.

TABLE 5

$$(X,Y) = (X,Y)" * ISF + (IA - (IA' * TSF))/2$$
$$= (X,Y)" * ISF + (IA * ((1,1) - (TSF/SF))/2$$
$$A(X,Y) = A(X,Y)" * ISF$$

As will be understood from the above equations, the incoming coordinates (X,Y)" are scaled up by RSF by application 201 and printer driver 203 does the remaining scaling by ISF and centers the position in the page. To do this, the extra spare room (when XSF does not equal YSF) is added to the incoming coordinates (X,Y)" once scaled up. The incoming distances (or dimensions) A(X,Y)" are also already scaled up by RSF by application 201 and printer driver 203 does the remaining scaling by ISF.

For example, suppose printer 105 currently has destination paper with the following constraints, set out in Table 6 below

TABLE 6

Destination Paper = PPS = 1000 × 2000 mm
Margins = PO = (5,10) mm
Destination printable area = IA = 990 × 1980
Resolution = RES = 600 dpi If the source paper (PPS') is 100×100 mm, then from the equations set out in Tables 3, 4 and 5, above, printer driver 203 is able to derive the following information set out in Table 7 below:

TABLE 7

SF  = PPS/PPS' = (10,20)
TSF = min(XSF,YSF) = min(10,20) = 10
ISF = 10
RSF = 1
IA' = IA/SF = 99 × 99 mm
PO' = PO/SF = (0.5, 0.5) mm
RES' = RES * RSF = 600 dpi × 1 = 600 dpi When printing, printer driver 203 converts coordinates (X,Y)" and distances A(X,Y)" received from GDI 202 to coordinates (X,Y) and distances A(X,Y) and distances, respectively, for printer output of printer 205 using the equations set out in Table 8 below.

TABLE 8

(X,Y) = (X,Y)" * ISF + IA * ((1,1) − (TSF/SF))/2
      = (X,Y)" * 10 + (990,1980) * ((1,1) − (1,.05))/2
      = (X,Y)" * 10 + (990,1980) * (0, 0.25)
      = (X,Y)" * 10 + (0,495)
A(X,Y) = A(X,Y)" * ISF
       = A(X,Y)" * 10

Thus when printer driver 203 receives instructions to draw a rectangle with the given corner coordinates of (0,0), (0,99), (99,0) and (99,99), printer driver 203 translates these using the appropriate equation in Table 5 to the coordinates of (0,495), (0,1485), (990,495) and (990,1485).

FIG. 9 shows a layout property page 240, generated by printer driver 203. An area 241 represents the physical page that will be printed out by printer 205. An area 242 represents the printable area on that page. Herein, printable area is also referred to as imageable area.

FIG. 9 also shows a box 243 which can be selected to enable a special print preview implemented by printer driver 203. While some applications provide a print preview capability, a print preview feature is particularly important for large format printers because the cost of print media and ink can be significant, and reprinting can be costly both in the cost of print media and ink as well as in time spent printing. For this reason, a print preview is implemented by printer driver 203 as follows.

Printer driver 203 requests GDI 202 to replay twice all the calls in the print job. In the first pass, printer driver 203 performs a whole page scan and redirects all the requests to a display which show a user what is going to be actually printed. If the user decides to go ahead, the driver will process again, in the second pass, all the calls to generate the output sent to printer 205.

When print preview is implemented, printer driver 203 reports to GDI 202 the need for banding support. This results in the operating system (e.g., Microsoft Windows operating system) storing all calls to printer driver 203 in a file (called a metafile), so that each band of the page indicated by printer driver 203 may be replayed as many times as needed.

In the preferred embodiment, printer driver 203 scans the page to show the preview. This is done by printer driver 203 reporting to GDI 202 a band as big as the whole page. GDI 202 then sends to printer driver 203 all the calls for the print job. Printer driver 203 answers all the calls that ask for information as if no print preview was enabled, but printer driver 203 changes its behavior for calls that lead to print something on the page. Instead of generating output for printer 205 (e.g., in HP-GL/2 or HP RTL format), printer driver 203 paints the calls into a "print progress" window shown on monitor 206. The dimensions and coordinates on the physical page are scaled down to the dimensions and coordinates of the window on the screen by defining the appropriate mapping between them. This is performed by printer driver 203.

In order to paint the wireframe of the drawing, printer driver 203 ignores any color, pattern fill, pen width or styled pen. Only the raster operation (ROP) will be kept. The different objects in the drawings are painted as follows by printer driver 203. Pixels are painted as pixels. For polygons and rectangles, just the outline is painted by printer driver 203. Polylines are painted by printer driver 203 as lines. For scanlines, printer driver 203 paints only the first and the last pixels of every segment in the scan lines. Printer driver 203 paints bitmaps and text as solid black rectangles which outline the represented bitmaps or text.

The page is printed on a printer by printer driver 203 as follows. In an object mode, printer driver 203 again reports to GDI 202 a band as big as the whole page. Alternatively, printer driver 203 can also use a "sleek" mode. In sleek mode, the output is drawn up into a series of bands. This allows printer driver 203 to use significantly less memory when performing the print. However, using sleek mode the printing can be significantly slower. When in sleek mode, printer driver 203 will report as many bands as necessary.

Printer driver 203 will then process all the calls in the regular way to generate output for printer 203. When the page has been printed, printer driver 203 reports to GDI 202 that the band is empty and moves forward to another page or terminates the print job.

In the preferred embodiment, when the print preview is enabled, a wireframe version of the job that is being printed is gradually drawn in the preview window of display 206. The user can wait to see the preview of each page and then validate the output to continue printing on printer 205. Alternatively, the user can skip the preview process for the current page being previewed and the rest of the pages for the job and begin printing right away on printer 205. Alternatively, the user can cancel the printing job at any time.

FIG. 10 shows a dialog box 245, originated by printer driver 203 and displayed on display 206, when called up by a user in accordance with an alternate preferred embodiment of the present invention. In a section 246 of dialog box 246, a paper size and source is selected by a user. In a section 245 of dialog box 245 zoom settings are selected.

Figure 11:
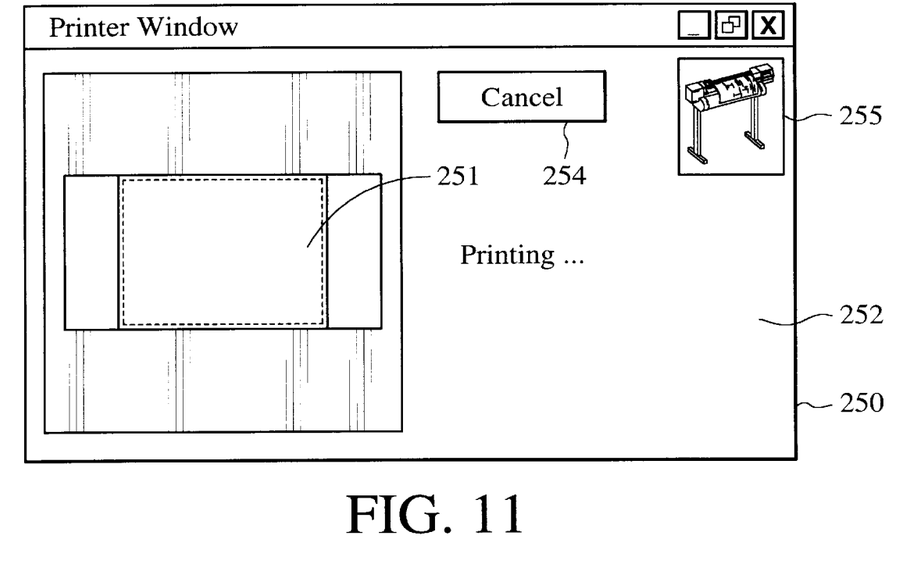
FIG. 11, FIG. 12, FIG. 13, FIG. 14 and FIG. 15 show window displays for the computing system shown in FIG. 5, the displays illustrate operation of a print preview feature of the computing system, in accordance with a preferred embodiment of the present invention.

FIGS. 11 through 15 illustrate the user interface window presented by printer driver 203 on monitor 204 to a user when printing is performed. In FIG. 11, print preview is disabled. Within a print progress window 250 (print progress window 250 is a user interface dialog box), a print preview area 251 represents the physical page that will be printed out by printer 205. Print progress window is a user interface dialog box. Within preview area 251 is shown a shaded area which represents the printable area on a page. An icon 253 and text 252 indicate that printing is occurring. A user can cancel printing by selecting "Cancel" button 254.

Figure 12:
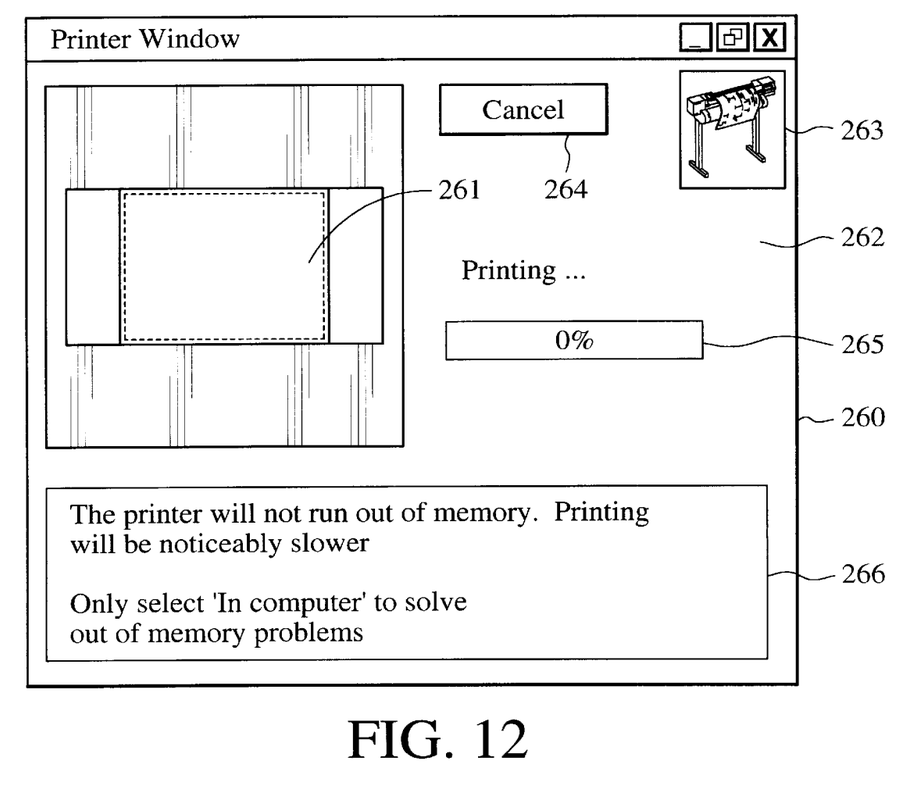

In FIG. 12, print preview is disabled and sleek mode is selected. Within a print progress window 260, a print preview area 261 represents the physical page that will be printed out by printer 205. Within preview area 261 is shown a shaded area which represents the printable area on a page. An icon 263 and text 262 indicate that printing is occurring. A user can cancel printing by selecting "Cancel" button 264. A box 265 shows the percent of the print job which has been performed. A warning box 266 indicates to a user that a sleek mode is being used.

Figure 13:
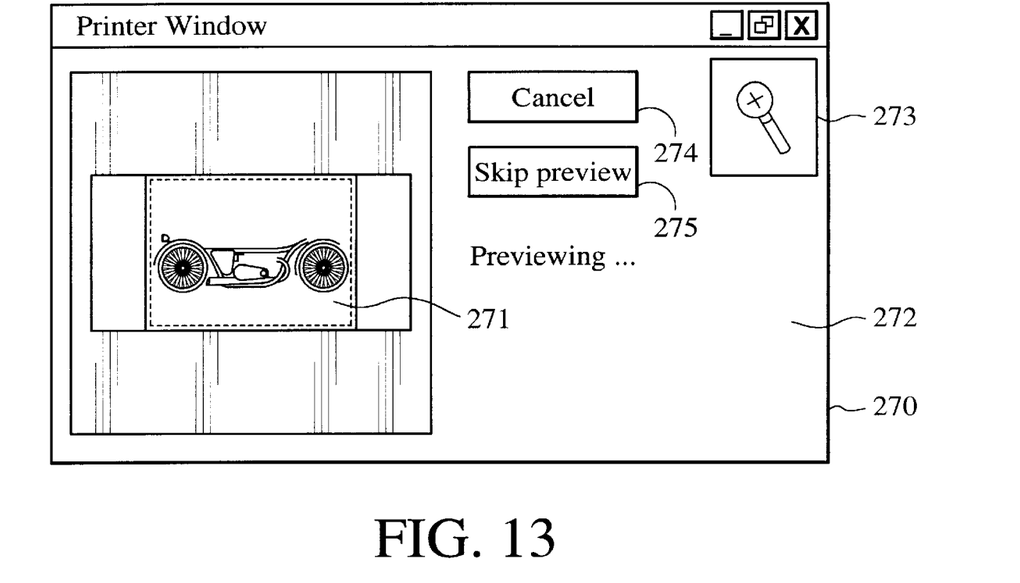

In FIG. 13, print preview is enabled. Within a print progress window 270, a print preview area 271 shows the drawing as it is previewed. An icon 273 and text 272 indicate that print preview is occurring. A user can cancel printing by selecting "Cancel" button 274 or skip preview by selecting a "Skip Preview" button 275.

Figure 14:
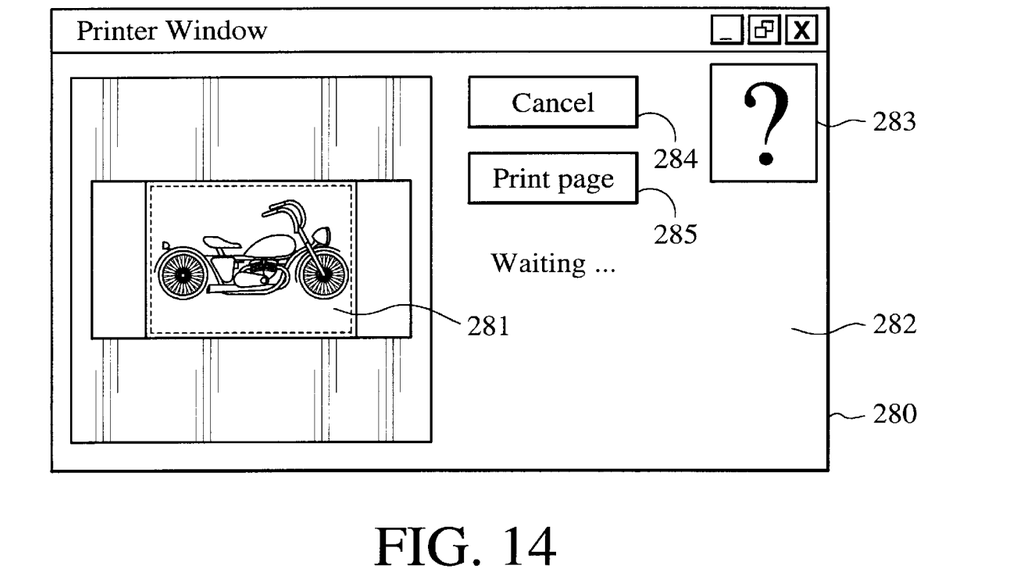

In FIG. 14, print preview of the page is completed and the program waits a period of time, e.g., 60 seconds, for a user to indicate whether the page should be printed. If the user makes no indication during the wait period, after the expiration of the wait period, the page is printed. During the wait period, within a print progress window 280, a print preview area 281 shows the complete preview of the drawing. An icon 283 and text 282 indicate that the printer is waiting for a response from the user. A user can cancel printing by selecting "Cancel" button 284 or start printing by selecting a print page button 285.

Figure 15:
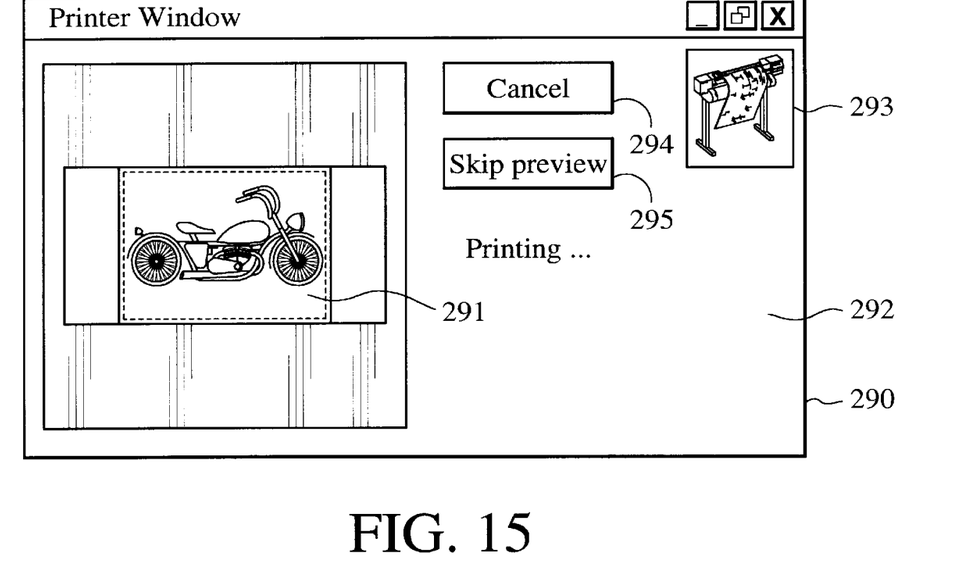

In FIG. 15, printing is occurring. Within a print progress window 290, a print preview area 291 shows the preview of the drawing. An icon 293 and text 292 indicate that printing is occurring. A user can cancel printing by selecting "Cancel" button 294. Preview of future pages, if they exist, can be skipped by selecting "Skip Preview" button 295.

Figure 16:
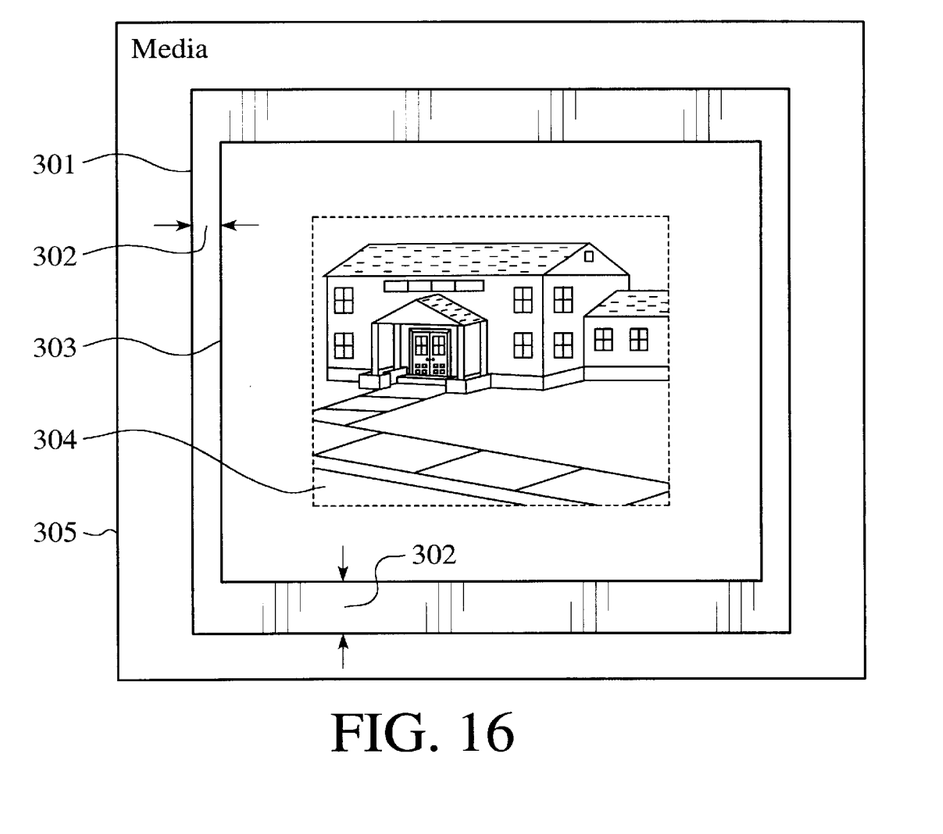
FIG. 16 illustrates the distinctions between page size, margin, plotting area and inked area.

FIG. 16 illustrates the distinctions between page size, margin, plotting area and inked area. Within media 305, a page size 301 is defined to be the amount of paper the print (or plot) will consume. Margins 302 are specific to the printer (or plotter). In a typical example, mechanical margins (hard-clip limits) for sheet media are 5 mm+/-2 mm on both sides and approximately 17 mm on the front and rear edges. These margins, with tolerances, may be subtracted from any supported media size to determine actual plotting area.

Printable (or plotting) area 303 is the page size minus the margins (also known as page hardclip). Inked area 304 is the smallest rectangle that contains all the print (plot) data.

In the preferred embodiment, GDI 202, shown in FIG. 5, makes calls to printer driver 203 for printing. These calls are device driver interface (DDI) calls, text DDI calls, pixel DDI calls or vector DDI calls. During print preview, printer driver 203 translates each of these DDI calls to a GDI call and returns the translated GDI call to GDI 202. GDI 202 then forwards the GDI call translated to a DDI call to driver 204 for display on monitor 206.

Table 9 below shows typical translations made by printer driver 203 to show a wireframe of the drawing.

TABLE 9

| DDI call received by printer driver 203 | GDI calls sent to GDI 202 |
|---|---|
| Raster Calls | |
| BitBlt | Rectangle |
| StretchBlt | Rectangle |
| SetDIBitsToDevice | Rectangle |
| StretchDIBits | Rectangle |

TABLE 9-continued

| DDI call received by printer driver 203 | GDI calls sent to GDI 202 |
|---|---|
| Text Calls | |
| ExtTextOut | Rectangle |
| Pixel Calls | |
| Pixel | SetPixel |
| Vector Calls | |
| OS_SCANLINES | SetPixel(first_pixel) |
| (cont) | SetPixel(last_pixel) |
| OS_RECTANGLE | MoveTo(point 0) |
| (cont) | LineTo(point 1) |
| (cont) | LineTo(point 2) |
| (cont) | LineTo(point 3) |
| (cont) | LineTo(point 0) |
| OS_ALTPOLYGON | MoveTo(point 0) |
| (cont) | LineTo(point 1) |
| ... | ... |
| (cont) | LineTo(point N) |
| OS_WINDPOLYGON | MoveTo(point 0) |
| (cont) | LineTo(point 1) |
| ... | ... |
| (cont) | LineTo(point N) |
| OS_POLYLINE | MoveTo(point 0) |
| (cont) | LineTo(point 1) |
| ... | ... |
| (cont) | LineTo(point N) |

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for providing a print preview of a print job, comprising the following steps:
   (a) forwarding, by an operating system to a printer driver, printing calls for the print job, wherein the printer driver is within a host computer, the host computer being separate from a printer which is a destination of the print job;
   (b) translating, by the printer driver, the printing calls to display calls for the print job;
   (c) forwarding, by the printer driver through the operating system to a display driver, the display calls; and,
   (d) displaying by the display driver on a display, a representation of the print job.

2. A method as in claim 1 wherein step (b) includes generating display calls which generate a simplified representation of the print job to be displayed in step (d).

3. A method as in claim 2 wherein in generating the simplified representation, the printer driver ignores any color, pattern fill, pen width and styled pen for the print job.

4. A method as in claim 2 wherein in generating the simplified representation, the printer driver paints just the outline of polygons and rectangles, and the printer driver paints bitmaps and text as solid black rectangles.

5. A method as in claim 4 wherein in generating the simplified representation, the printer driver paints polylines as lines, and the printer driver paints only first and last pixels of every segment in scan lines.

6. A method as in claim 1 additionally comprising the following step:
   (e) in response to a user selecting a "skip preview" button on a print progress window, printing the print job on a printer.

7. A method as in claim 6 wherein step (e) includes the following substep:

(e.1) when during the predetermined amount of time, user input is received directing the print job to be canceled, canceling the print job.

8. A method as in claim 1 additionally comprising the following steps:

(e) after displaying a page of the print job on the display, waiting a predetermined amount of time for user input, before printing the page of the print job; and, (f) when the predetermined amount of time expires before user input is received, printing the page of the print job.

9. A method as in claim 8 wherein step (e) includes the following substep:

(e.1) when during the predetermined amount of time, user input is received directing the print job to be canceled, canceling the print job.

10. A method as in claim 1 additionally comprising the following steps:

(e) again forwarding, by the operating system to the printer driver, the printing calls for the print job; and, (b) printing by the printer driver on a printer, the print job.

11. Storage media which stores software which performs a method for providing a print preview of a print job, comprising the following steps:

(a) forwarding, by an operating system to a printer driver, printing calls for the print job, wherein the printer driver is within a host computer, the host computer being separate from a printer which is a destination of the print job;

(b) translating, by the printer driver, the printing calls to display calls for the print job;

(c) forwarding, by the printer driver through the operating system to a display driver, the display calls; and, (d) displaying by the display driver on a display, a representation of the print job.

12. Storage media as in claim 11 wherein step (b) includes generating display calls which generate a simplified representation of the print job to be displayed in step (d).

13. Storage media as in claim 12 wherein in generating the simplified representation, the printer driver ignores any color, pattern fill, pen width and styled pen for the print job.

14. Storage media as in claim 12 wherein in generating the simplified representation, the printer driver paints just the outline of polygons and rectangles, and the printer driver paints bitmaps and text as rectangles which outline the bitmaps and the text, respectively.

15. Storage media as in claim 14 wherein in generating the simplified representation, the printer driver paints polylines as lines, and the printer driver paints only first and last pixels of every segment in scan lines.

16. Storage media as in claim 11 wherein the method additionally comprises the following step:

(e) in response to a user selecting a "skip preview" button on a print progress window, printing the print job on a printer.

17. Storage media as in claim 11 wherein the method additionally comprises the following steps:

(e) after displaying a page of the print job on the display, waiting a predetermined amount of time for user input, before printing the page of the print job; and, (f) when the predetermined amount of time expires before user input is received, printing the page of the print job.

18. Storage media as in claim 17 wherein step (e) includes the following substep:

(e.9) when during the predetermined amount of time, user input is received directing the print job to be canceled, canceling the print job.

19. Storage media as in claim 11 wherein the method additionally comprises the following steps:

(e) again forwarding, by the operating system to the printer driver, the printing calls for the print job; and, (b) printing by the display driver on a printer, the print job.

20. A computer system comprising:

an operating system;

a display;

a display driver, coupled to the display, for controlling the display; and, a printer driver for driving a printer, wherein the printer driver is within a host computer, the host computer being separate from the printer, the printer driver comprising:

receiving means for receiving from the operating system, printing calls for a print job, translating means for translating the printing calls to display calls for the print job, and forwarding means for forwarding, through the operating system to the display driver, the display calls;

wherein in response to receiving the display calls, the display driver displays a representation of the print job on the display.

21. A computer system as in claim 20 wherein the translating means generates display calls which generate a simplified representation of the print job to be displayed by the display.

22. A computer system as in claim 21 wherein when the translating means generates display calls for the simplified representation, the translating means ignores any color, pattern fill, pen width and styled pen for the print job.

23. A computer system as in claim 21 wherein when the translating means generates display calls for the simplified representation, the translating means paints just the outline of polygons and rectangles, and the translating means paints bitmaps and text as solid rectangles.

24. A computer system as in claim 23 wherein when the translating means generates display calls for the simplified representation, the translating means paints polylines as lines, and the translating means paints only first and last pixels of every segment in scan lines.

25. A computer system as in 20 wherein the printer driver additionally comprises:

print means for, in response to a user selecting a "skip preview" button on a print progress window, printing the print job on a printer.

26. A computer system as in claim 20 wherein after displaying a page of the print job on the display, the printer driver waits a predetermined amount of time for user input, before printing the page of the print job, and wherein when the predetermined amount of time expires before user input is received, the printer driver prints the page of the print job.

27. A computer system as in claim 26 wherein the printer driver includes means for canceling the print job when user input is received directing the print job to be canceled.

* * * * *